United States Patent [19]

Arsenault et al.

[11] Patent Number: 5,319,217
[45] Date of Patent: Jun. 7, 1994

[54] DOOR ASSEMBLY FOR CASSETTE AUTOLOADER

[75] Inventors: Wayne J. Arsenault, Churchville; John C. Boutet; Darryl D. DeWolff, both of Rochester, all of N.Y.; James D. Lattimore, Safety Harbor, Fla.; Gary W. Shope, Rochester, N.Y.; Jeffrey J. Yaskow, Williamson, N.Y.; Thomas D. Baker, Livonia, N.Y.

[73] Assignee: Eastman Kodak Company, Rochester, N.Y.

[21] Appl. No.: 981,674

[22] Filed: Nov. 25, 1992

[51] Int. Cl.⁵ .................................................. G01N 23/04
[52] U.S. Cl. ..................................... 250/589; 250/590
[58] Field of Search ............... 250/327.2, 484.1, 584, 250/585, 589, 484.4

[56] References Cited

U.S. PATENT DOCUMENTS

| | | | |
|---|---|---|---|
| 3,465,476 | 9/1969 | Rayner et al. | 49/28 |
| 3,710,050 | 1/1973 | Richards | 49/28 |
| 3,855,773 | 12/1974 | Miller | 49/27 |
| 3,973,772 | 2/1974 | Kouth | 49/28 |
| 4,115,952 | 9/1978 | French | 49/26 |
| 4,608,679 | 8/1986 | Rudy et al. | 369/36 |
| 4,644,425 | 2/1987 | Tamaki | 360/69 |
| 4,654,727 | 3/1987 | Blum et al. | 360/71 |
| 4,675,856 | 6/1987 | Rudy et al. | 369/36 |
| 4,685,095 | 8/1987 | Rudy et al. | 369/36 |
| 4,789,782 | 12/1988 | Ohara | 250/327.2 |
| 4,807,208 | 2/1989 | Geiger | 369/34 |
| 4,944,116 | 7/1990 | Mewald | 49/27 |
| 4,953,608 | 9/1990 | Larson | 49/28 |
| 4,984,658 | 1/1990 | Peelle et al. | 49/25 |
| 5,021,902 | 6/1991 | Ishikawa et al. | 360/92 |
| 5,027,552 | 7/1991 | Miller et al. | 49/27 |
| 5,036,503 | 7/1991 | Tomita | 369/36 |
| 5,041,929 | 8/1991 | Fryberger et al. | 360/92 |
| 5,050,019 | 9/1991 | Koyama et al. | 360/92 |
| 5,056,073 | 10/1991 | Fitzgerald | 369/32 |
| 5,059,772 | 10/1991 | Younglove | 360/92 |
| 5,079,417 | 1/1992 | Strand | 250/221 |
| 5,084,859 | 1/1992 | Ishibashi et al. | 369/34 |
| 5,099,465 | 3/1992 | Geiger et al. | 369/36 |
| 5,123,000 | 7/1992 | Fitzgerald et al. | 369/36 |
| 5,132,949 | 7/1992 | Choi | 369/37 |

*Primary Examiner*—Carolyn E. Fields
*Attorney, Agent, or Firm*—Peter J. Bilinski

[57] ABSTRACT

In an apparatus for storing and automatically delivering cassettes and/or pallets containing cassettes to a reader. The apparatus includes a plurality of cassette retaining sites. A door assembly is provided adjacent the portal for allowing access to the plurality of cassette retaining sites. The door assembly has at least one panel slideably mounted to the apparatus for movement between a closed position and an open position. Sensors are provided for determining if a foreign object is in the closure path of the at least one panel.

22 Claims, 10 Drawing Sheets

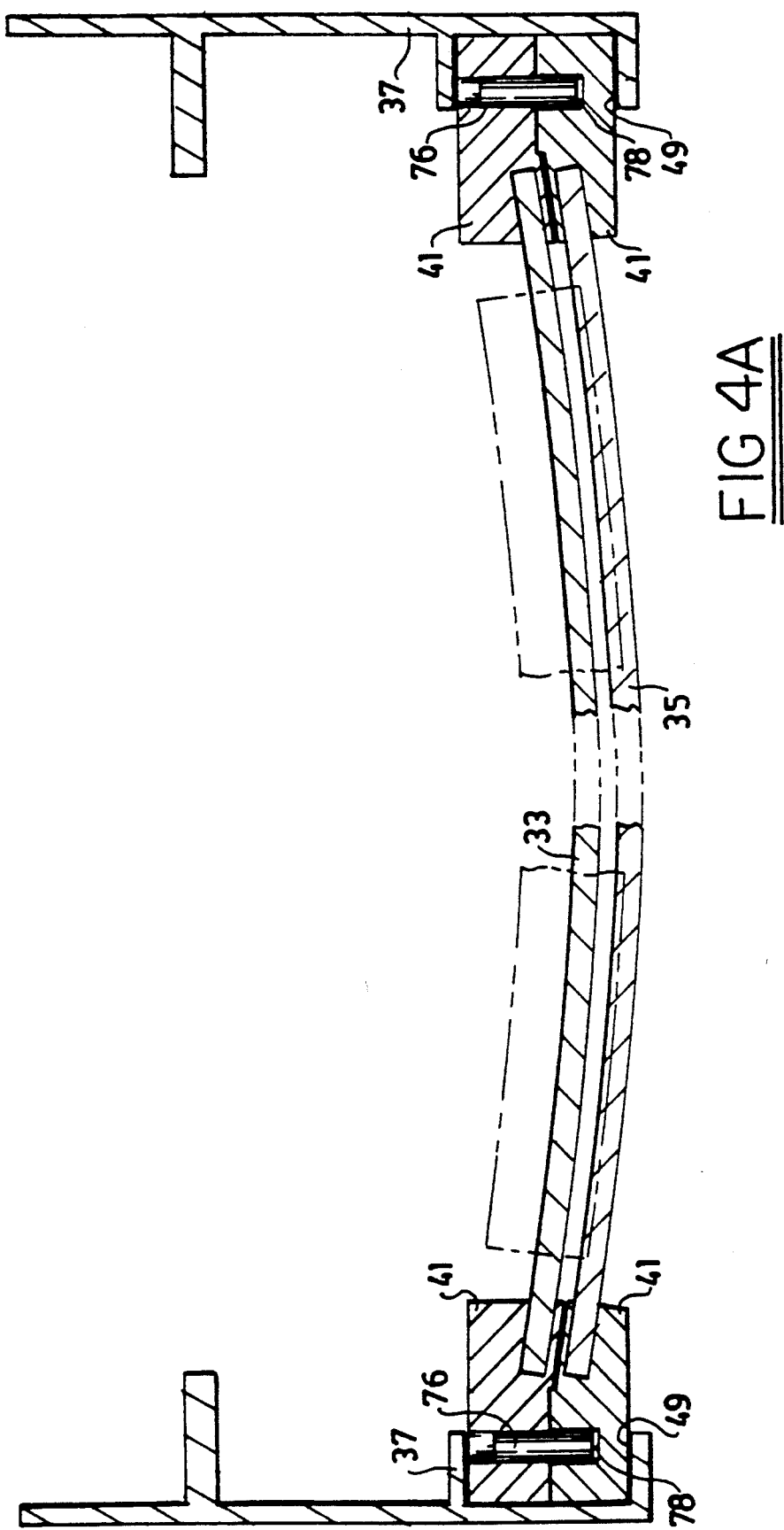

DOOR ASSEMBLY FOR CASSETTE AUTOLOADER

CROSS REFERENCE TO RELATED APPLICATIONS

Reference is made to the following commonly assigned copending U.S. application Ser. Nos.:

U.S. Ser. No. 902,214, entitled "X-ray Cassette Positioner", filed Jun. 22, 1992 in the name of John C. Boutet;

U.S. Ser. No. 800,799, filed Nov. 27, 1991, entitled "X-ray Cassette Having Removable Photographic Element" by Jeffrey C. Robertson.

BACKGROUND OF THE INVENTION

The present invention pertains to equipment used in processing photosensitive material, and more particularly to a door assembly for an autoloader for feeding cassettes and/or pallets containing cassettes to and receiving them from a computed radiographic reader.

It is convenient to handle storage phosphorous film/plates within cassettes that protect the film from extraneous light and damage. Storage phosphorous film is read by photoelectrically detecting an image formed by scanning with stimulating radiation. An example of such a scanner/reader is disclosed in U.S. Pat. No. A-4,789,782 to O'Hara. It is desirable to retain the x-ray film within a cassette except during actual processing. Such a cassette is disclosed in U.S. patent application Ser. No. 800,799, filed Nov. 27, 1991, entitled "X-ray Cassette Having Removable Photographic Element" by Jeffrey C. Robertson, which is incorporated herein by reference. A hook extractor can be used with the x-ray cassette to remove a photographic element and scan the cassette in an x-ray reader. It is desirable to provide an apparatus to automate the presentation of such x-ray cassettes or similar cassettes to the extractor in the reader so that a number of x-ray cassettes could be processed in succession without attention from an operator It is also desirable that such an apparatus be able to accurately position x-ray cassettes and/or pallets containing cassettes sequentially to simplify removal and reinsertion of the photographic elements and that the presentation apparatus be separate from the x-ray reader to permit interchange of units and reduce repair time. An example of a suitable device for presenting cassettes is disclosed in copending application U.S. Ser. No. 902,214 filed Jun. 22, 1992, entitled "X-ray Cassette Positioner" of John C. Boutet et al which is also hereby incorporated by reference. In this reference there is disclosed a positioner/autoloader for use with a plurality of x-ray cassettes and/or pallets containing cassettes which comprise first and second cog belts spaced apart so as to provide a plurality of cassette retaining sites one of which defines a cassette read site for presenting of the cassette to the reader. Access to the loading and unloading sites is obtained through a portal in the cabinet enclosing the mechanism. An access door is provided for allowing access within the cabinet through the portal. The belts are driven such that the cassettes are each individually positioned at the read site for removal of the photosensitive film therein for reading by the reader after which it is returned to the cassette. The positioner allows a plurality of individual cassettes to be stored for automatic supplying to the reader thus freeing the operator to accomplish other duties. With such autoloaders it is important that the device be designed to operate in such a manner so as to minimize any transfer of vibrations from the autoloader to the reader which can adversely affect the reader reading the information stored on the photo stimulable phosphorous film. Thus it is important that the door which allows access to the loading and unloading sites operate in smooth manner with a minimal amount of vibrations. The operator may be carrying a number of cassettes either to or from the reader, therefore, it is also desirable that the door be easy and convenient to use. It is also important that the door not close if the cassettes have not been properly loaded or unloaded from the device or an obstruction is in the path of the door.

In accordance with the present invention there is provided a mechanism for automatically opening and closing the access door to the portal of an autoloader which is designed to minimize transfer of vibrations to the reader which can adversely affect the reading of the photographic element, which is reliable, can monitor if the cassettes have been properly loaded or unloaded, and determine if there are obstructions in the path of the door.

SUMMARY OF THE INVENTION

In an apparatus for storing and automatically delivering cassettes and/or pallets containing cassettes to a reader, comprising:

means defining a casette read site and a plurality of cassette retaining sites;

a body encasing said means defining the retaining sites, the body having a portal adjoining the cassette sites for allowing casettes to be placed on or removed from the loading sites and unloading sites;

a door assembly placed adjacent the portal for allowing access through the portal, the door assembly having at least one door slideably mounted to the apparatus for movement between a closed position and an open position, means for moving the door between the open and closed positions, and means for sensing if a foreign object is in the closure path of at least one door.

BRIEF DESCRIPTION OF THE DRAWINGS

In the detailed description of the preferred embodiment of the invention presented below reference is made to the accompanied drawing, in which:

FIG. 4A is a cross-sectional view of the door assembly of FIG. 4 as taken along line 4A—4A;

DESCRIPTION OF A SPECIFIC EMBODIMENT

Figure 1:
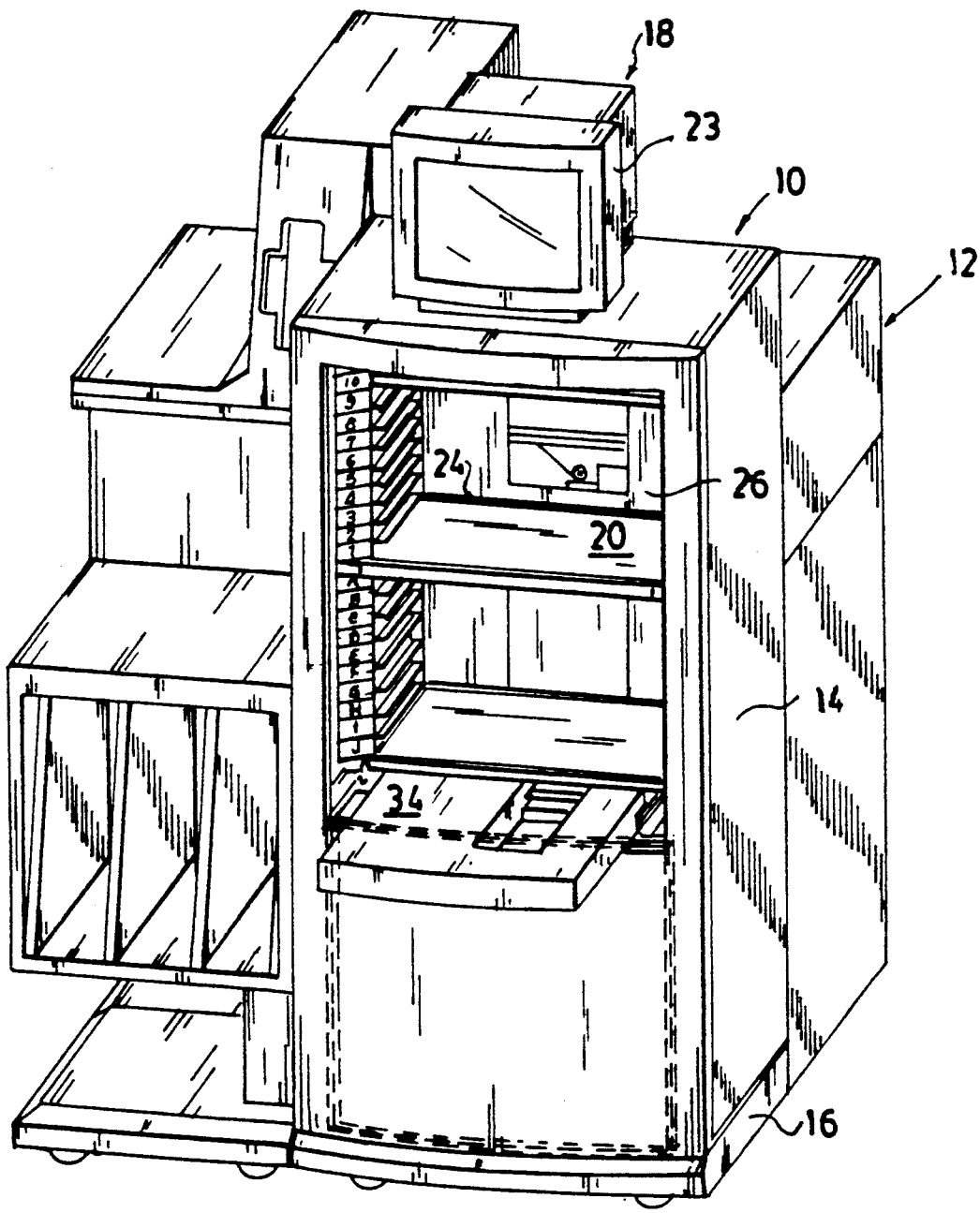
FIG. 1 is a front perspective view of an x-ray cassette autoloader made in accordance with the present invention along with an x-ray reader and monitor illustrating the door assembly in the open position and the retractable shelf in the extended position.
Figure 1A:
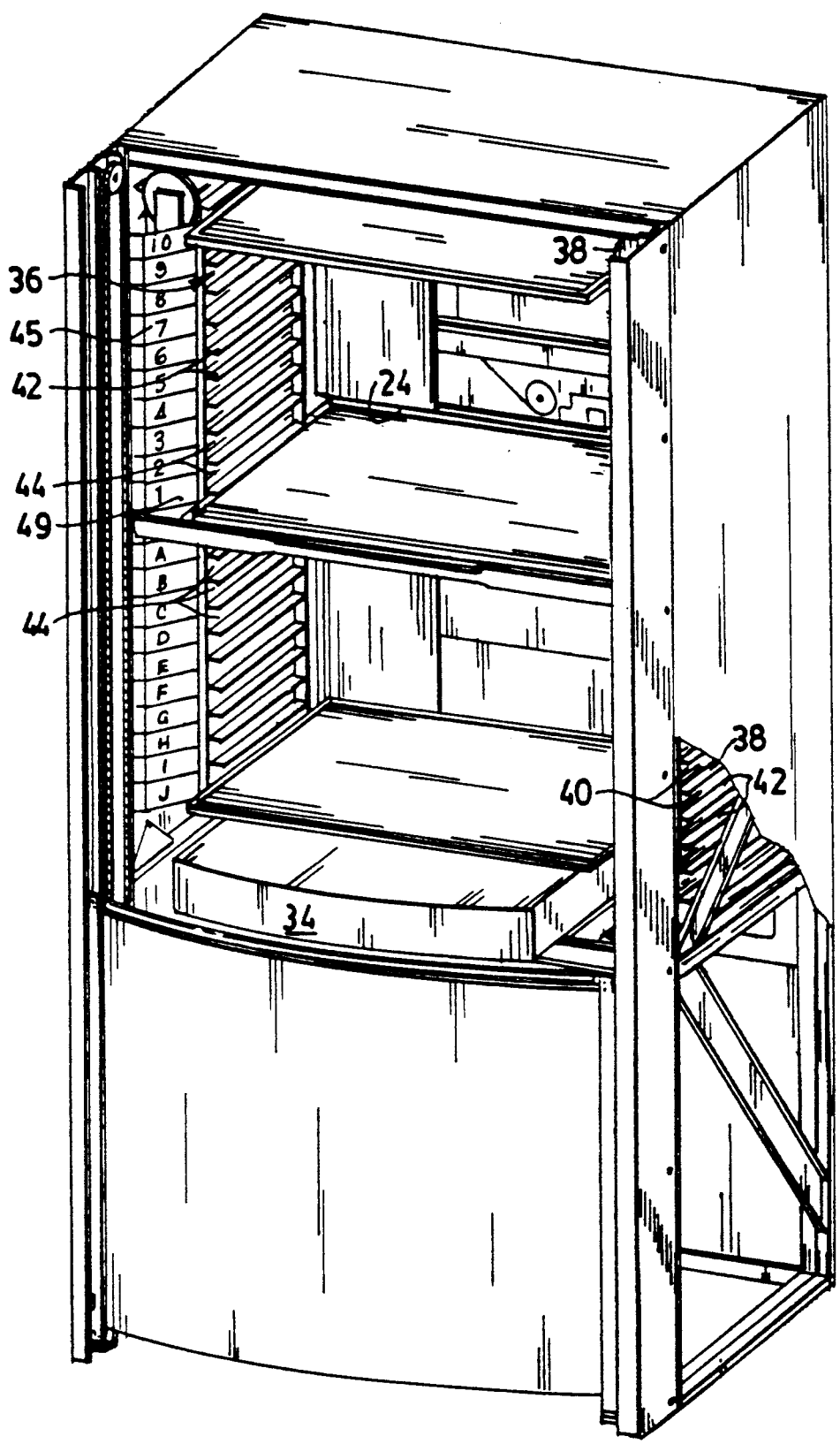
FIG. 1A is a perspective view of the autoloader of FIG. 1 with the body partially broken away and the door in the opened position with the shelf in the retracted position.

Referring to FIGS. 1 and 1A there is illustrated an autoloader (10) made in accordance with the present invention positioned directly in front of an X-ray reader (12). The autoloader has a body (14) with a base (16) at the bottom and a monitor station (18) on top. The body (14) can be made of sheet metal or the like reinforced as necessary to support loads imposed by the autoloader components and x-ray cassettes (20) or pallets containing cassettes. The cassette is of the type wherein the photosensitive material is removed through one of the sides of the cassette such as that described in pending application of Jeffrey C. Robertson, Ser. No. 800,799, previously referred to herein. Briefly, the cassette comprises a shell having upper and lower panels and three side caps joining the upper and lower panels, and a removable end cap. A photographic element, such as a stimulable phosphor plate, is provided within the cassette and is secured to the removable end cap. The end cap includes a latching mechanism for releasing the end cap from the cassette. A latch bar having at least one hook is used to latch or unlatch the latching mechanism. It is to be understood that other cassette construction may be used as appropriate, such as that disclosed in U.S. Pat. No. A-5,065,866 and U.S. Pat. No. A-5,090,567. Additionally, an example of a suitable pallet for use in the ,autoloader 10 is described in copending application as U.S. Ser. No. 981,710 filed concurrently with this application entitled "Pallet for Holding a Cassette" of John Boutet, James F. Owen, Wayne Arseneault, Jeff Yaskow, and Thomas Dale Baker which is hereby incorporated by reference. Monitor station (18) may include some means for preventing inadvertent movement of the monitor (23), such as indentations. At the rear, body (14) has an access opening (24), as best seen by reference to FIG. 1A, through which the forward end of a cassette is passed so that the forward end of the cassette (20) is placed within the adjacent X-ray reader (12). At the front, body (14) has a portal (26) which is generally rectangular in shape and provides access to the interior of body (14). Facing portal (26) is an operator station, which may be occupied by an operator.

Figure 2:
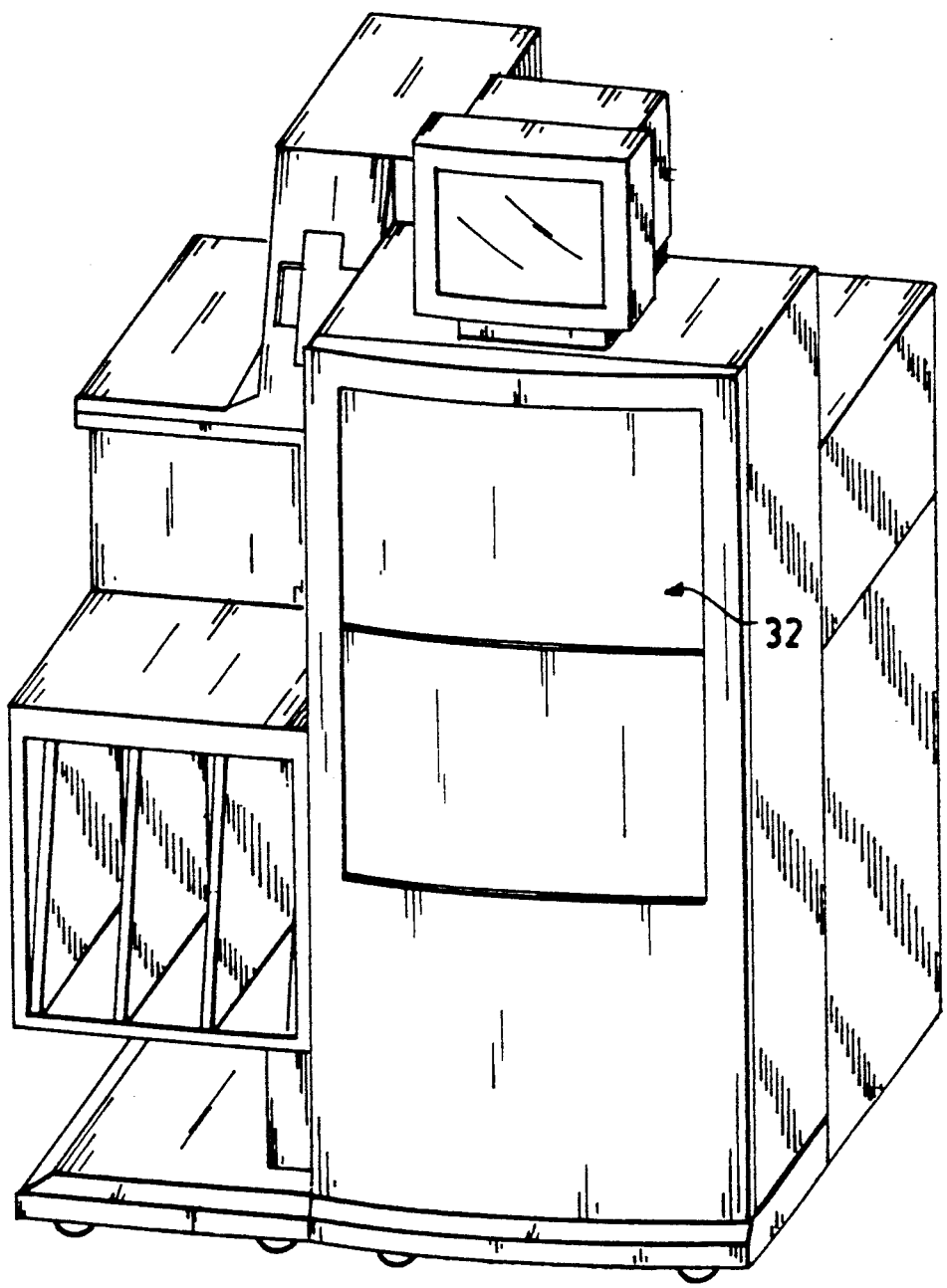
FIG. 2 is a view similar to FIG. 1 illustrating the retractable shelf in the retracted position and the door assembly in the closed position.
Figure 3:
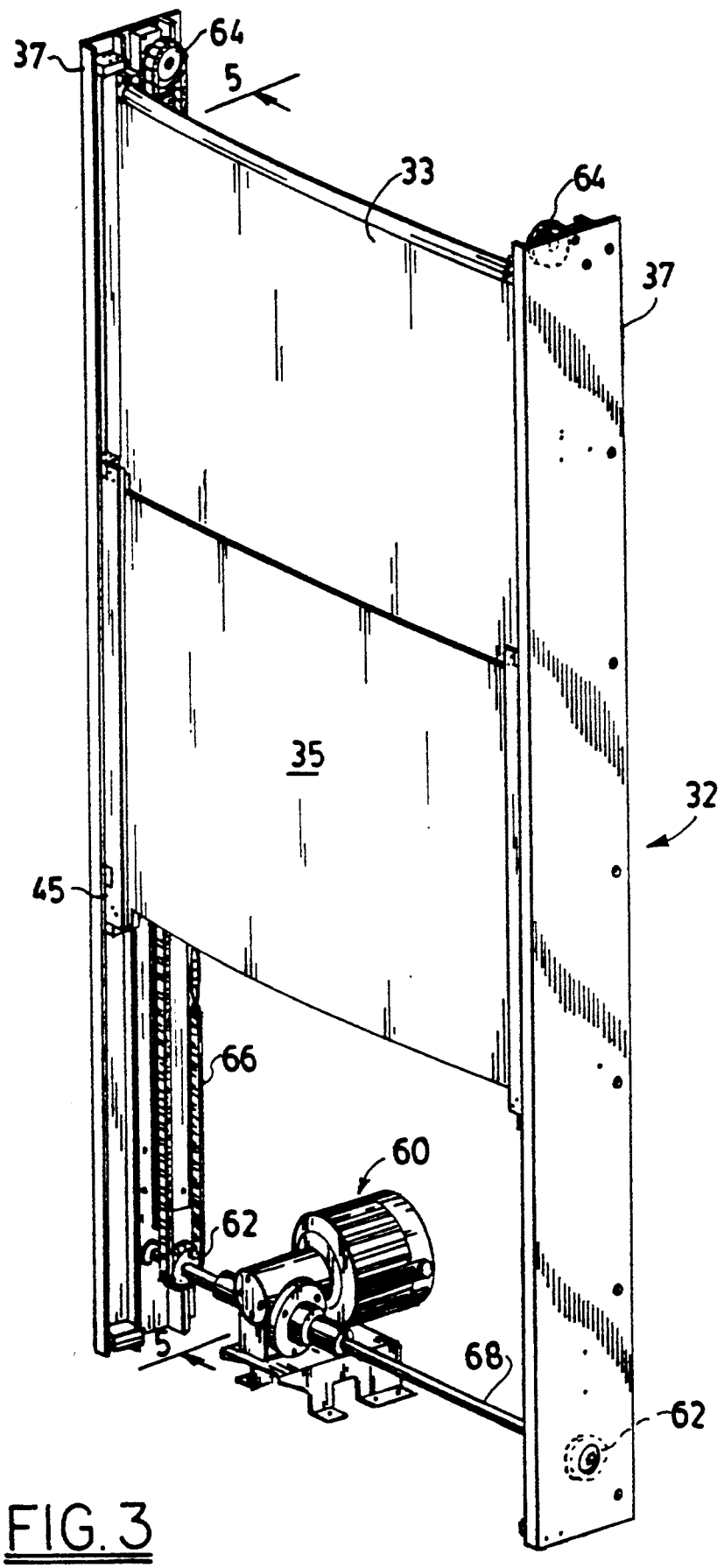
FIG. 3 is a perspective view of the door assembly used in the positioner of FIGS. 1 and 2 illustrating the door assembly in the closed position.
Figure 4:
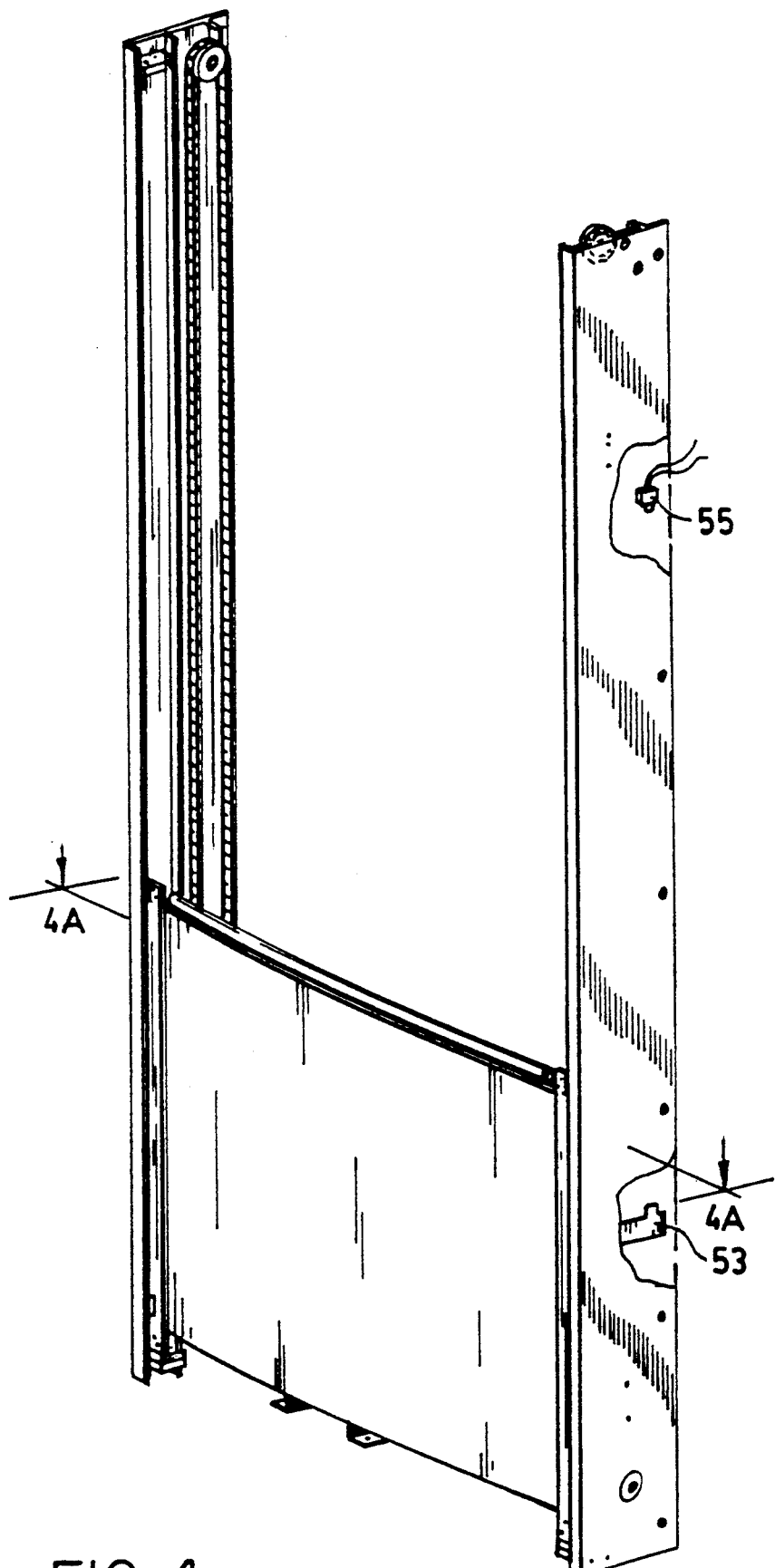
FIG. 4 is a view similar to FIG. 3 illustrating the door assembly in the open position.

A door assembly (32) is provided adjacent portal (26) of body (14) which is operable between a closed position, as shown in FIG. 2, in which the portal (26) is closed and an open position, as shown in FIG. 1 in which the interior of body (14) is accessible through portal (26). The door assembly includes a pair of panels (33),(35) slideably mounted to a pair of slide members (37) which are secured to frame (39). In the particular embodiment illustrated, the panels (33),(35) (see FIGS. 4 and 4A) each have a slide block (41) secured at each of the lateral edges of panels (33),(35). The slide blocks (41) slide within a single channel (49) provided in each of the slide members. A guide member (51) is provided at the top of panel (33) and at the bottom of panel (35) so as to maintain each of the panels (33),(35) in position in channel (49). Slide blocks (41) and slide members (37) are made of a material which allows easy sliding therebetween. In the particular embodiment illustrated, the slide members (37) are made of polytetrafluoroethylene (Teflon TM ) and the slide blocks (41) are made of aluminum and have an outer coating of polytetrafluoroethylene. However, the slide member (37) and slide blocks (41) may be made of any suitable material that allows sliding with the associated slide member. Means are also provided for identifying when the door assembly is in the closed position. In the embodiment illustrated, a member (53) is secured to panel (33) which engages a switch (55) secured to the frame or slides when the door panel (33) is in the closed position.

Referring to FIG. 1A, the autoloader is provided with a first and second conveyor assembly (36),(38), respectively. Each conveyor assembly (36),(38) is provided with an endless cog belt (40), each cog belt (40) having a plurality of regularly spaced shelves (42). The cog belts (40) are aligned and driven such that the shelves (42) provide a plurality of vertically arranged cassette retaining sites (44) within body (14). In line with the center of access opening (24) there is provided a read site (46) whereby the cassette when placed in such position can be advanced for reading into the adjacent x-ray reader (12). The cassette retaining sites (44) above read site (46) are loading sites wherein cassettes which have yet to be read are placed. In the particular embodiment illustrated, these loading sites are identified by numerals, one through ten, placed on side panels (45),(47). The cassette retaining sites (44) below read site (46) are unloading sites and are preferably identified by different indicia from that of loading sites. In the particular embodiment illustrated, the unloading sites are identified by letters and in particular, by the letters A-J. Cassettes (20) can be interchanged between loading sites easily since each cassette is supported by a pair of vertically aligned shelves (42) and cassettes (20) are spaced apart from each other by a distance sufficient to permit each individual cassette (20) to be gripped while positioned fully to the back of every cassette retaining site (44). While only one read site is provided, any number of loading and unloading sites may be provided as desired. In the particular embodiment illustrated, there is provided ten loading sites and ten unloading sites. To prevent accidental placement or attempted removal of a cassette from read site (46), a cross bar (49) is secured to body (14) in front of read site (46).

The cog belts (40) are driven in unison by a drive means provided. An example of a mechanism used to drive cog belts (40) is more fully described in copending application U.S. Ser. No. 902,214, previously referred to herein. Such mechanism is used to in seriatim place cassettes at the read site for removal of the photosensitive material and delivery to the reader and to unloading sites after the photosensitive material has been returned to the cassette.

Figure 5:
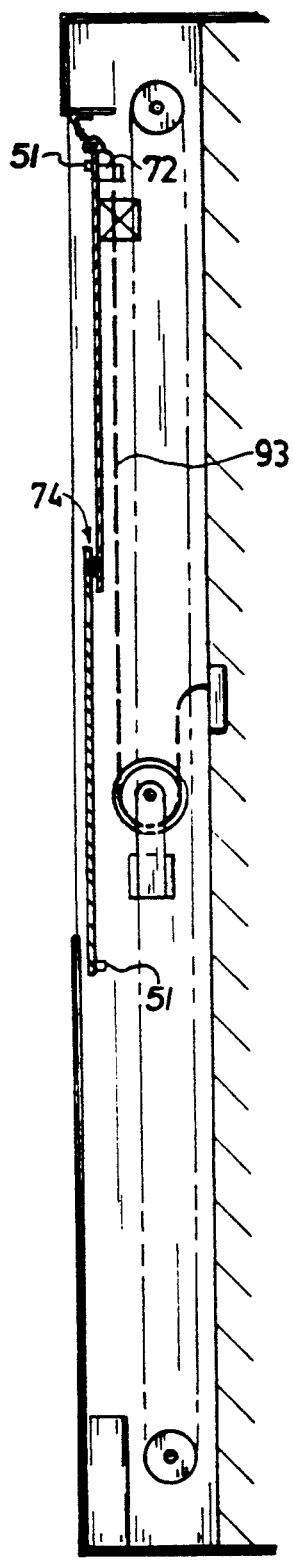
FIG. 5 is a side cross-section view of the door assembly of FIG. 3 as taken along line 5—5 of the door assembly in the closed position.
Figure 6:
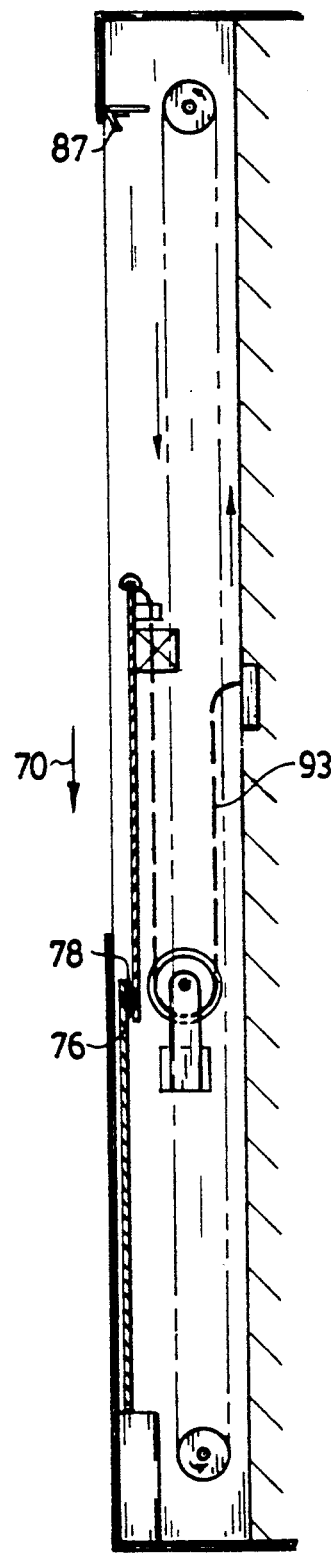
FIGS. 6 and 7 are cross-sectional views similar to FIG. 5 illustrating the door panels as they move to the open position.
Figure 7:
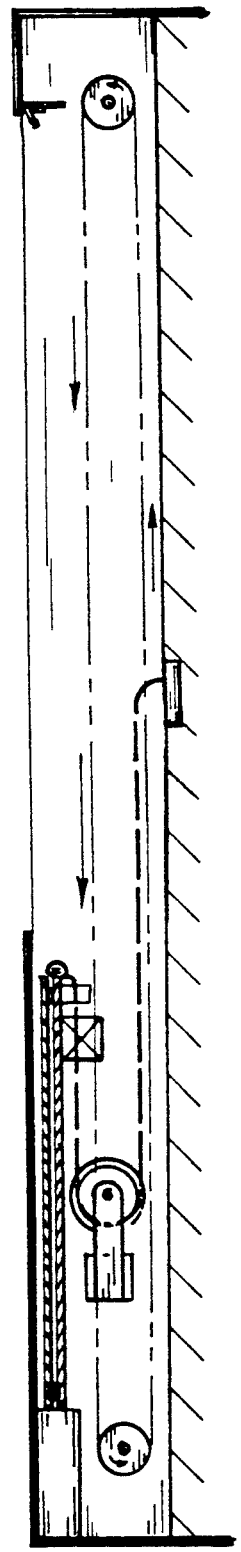

Means are provided for automatically moving the door panels (33),(35) between the open position as illustrated in FIG. 1 and the closed position as illustrated in FIG. 2. In particular there is provided an electric motor (60) connected to an appropriate source of power. The motor (60) is also connected to a microprocessor control unit (not shown) which controls the operation of the autoloader. The implementation and use of microprocessors is well known to those skilled in the art and therefore will not be discused any further. A pair of idler gears (62),(64) are provided on each slide member (37), gear (64) being located near the top of the slide member (37) and gear (62) being located near the bottom of the slide member (37). A drive chain (66) is provided between each pair of gears (62),(64) and form a closed loop about which the chain (66) moves. The motor (60) is coupled to the bottom gears (62) by drive shaft (68) so as to cause the bottom gears (62) to rotate in either direction and thus drive the chain (66) in the desired direction about the closed loop. The top panel (33) is secured to chains (66) at an appropriate point so that the chains (66) can be moved in the direction indicated by arrow (70) in FIG. 6, from the closed position illustrated in FIG. 5 to the open position illustrated in FIG. 7. The top panel (33) may be secured to drive chain (66) by any appropriate means. In the particular embodiment illustrated, chains (66) are secured to a drive block (72) placed at each of the top corners of the panel (33). As can be seen by reference to FIGS. 5-7, only the top panel (33) is connected to chains (66). The bottom panel (35) is driven upward by the connection it makes with top panel (33). The bottom portion (74) of the slide blocks (41) of top panel (33) are provided with a projection (76) which engages a slot (78) in the adjacent slide block provided on the top portion (80) of bottom panel (35) (see FIG. 4A). Preferably, the pin is made of an acetal resin, such as Delrin TM, made by DuPont, and provides shock vibration. Thus the bottom panel (35) will remain in the bottom position as illustrated in FIG. 7 until the projection (76) engages the top of slot 78 as illustrated in FIG. 6. As the top panel (33) continues to be driven upward as illustrated in FIG. 5, the bottom panel (35) will be driven up by the top panel (33).

Figure 8B:
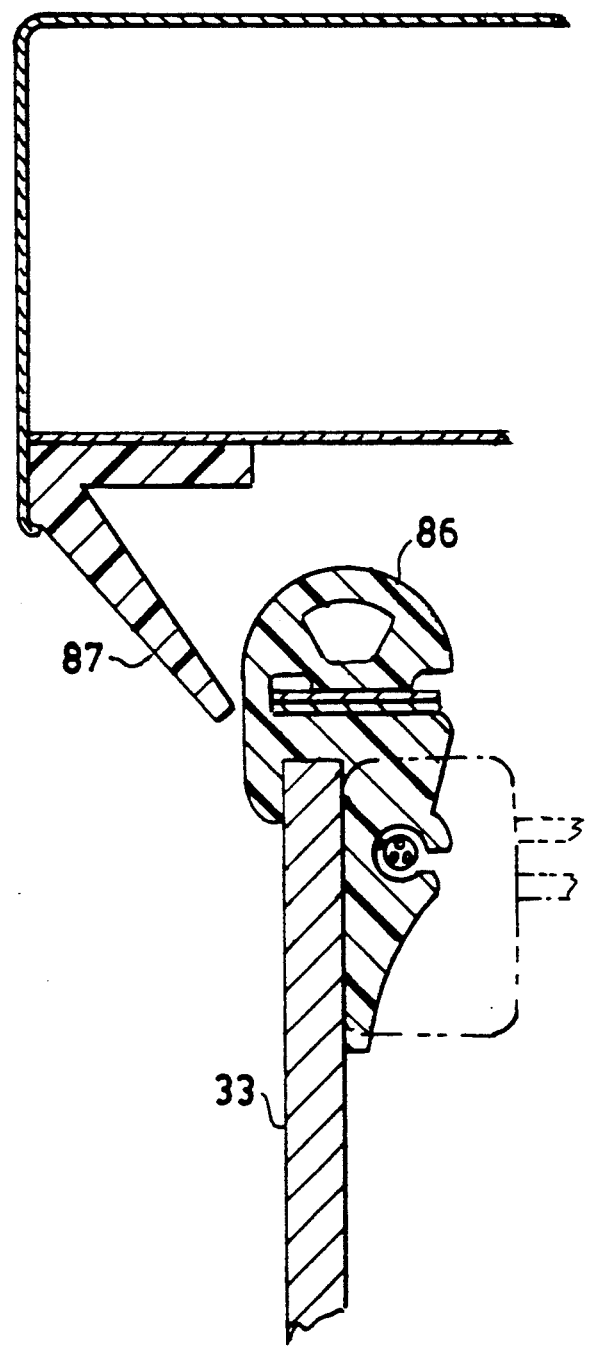
FIG. 8B is a partial side view of top panel of FIG. 8 illustrating the door in the closed position.
Figure 8:
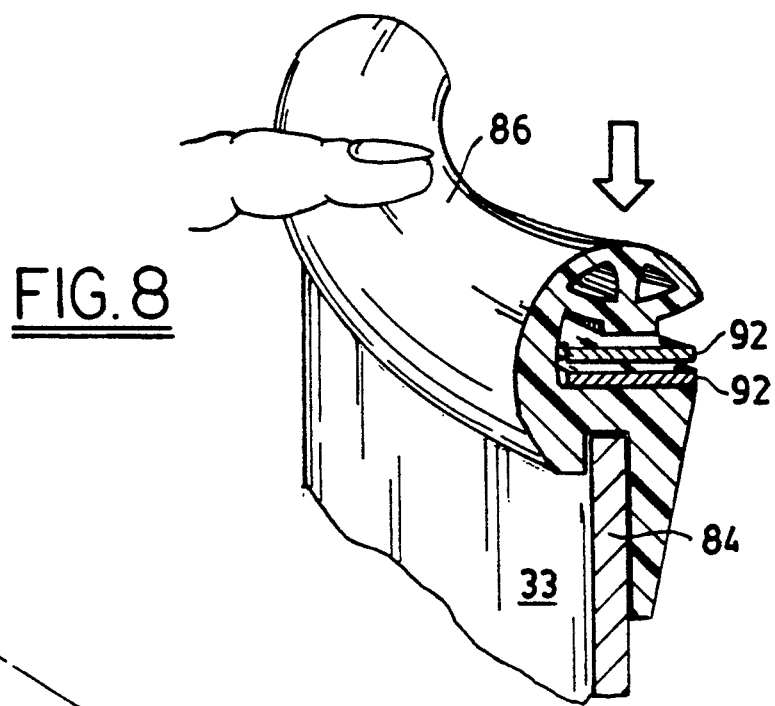
FIG. 8 is an enlarged perspective view of a portion of the top panel of the door assembly illustrating a sensor for sensing if something is in the path of the door.

Referring to FIG. 8, there is illustrated a partial perspective view of the top portion (84) of the top panel (33). The top portion is provided with an elastomeric extrusion (86) (see FIGS. 5-7). The extrusion (86) has a cross-sectional configuration and is made of a material that cushions the impact of the door against any object or obstruction that may be in the way of the door travel as it closes. In the particular embodiment illustrated, extrusion (86) is made of a 70-80 Shore A Durometer rubber-like material.

Referring to FIG. 8A, the panel (33) is shown in the closed position. As can be seen, the extrusion does not contact the body of the autoloader. The top of portal (26) is provided with an elastomeric trim piece (87) designed to extend in front of extrusion (86) and slightly below the top surface. The trim piece (87) is made of a material similar to extrusion (86). Therefore, if an object is caught between extrusion (86) and trim piece (87), these parts will deflect so as to minimize or avoid damage or injury to the obstruction.

Means are provided for determining if an obstruction is present in the path of top panel (33) that would stop the door panel from any further travel. In the embodiment illustrated in FIG. 8, there is provided a pair of pressure sensors (92) designed to produce a signal in the event that an object is pressed against the top of panel (33). The signal produced is sent to the microprocessor control unit which also controls the operation of motor (60). If a signal is produced which indicates that an obstruction is present, the motor (60) will be reversed so as to reopen the door assembly. While only one sensor (92) need be used, two are used in the embodiment illustrated in the event one of the sensors becomes inoperative. As illustrated in FIGS. 5-7 and, in particular, FIGS. 5A-7A, a tape-type electrical ribbon (93) is used to connect sensors (92) to the microprocessor control unit. As shown in FIGS. 5-6, a pulley (89) is connected to a weight (91) for maintaining the ribbon (93) in a generally U-shaped configuration as the door panel (33) moves through its path.

Figure 9:
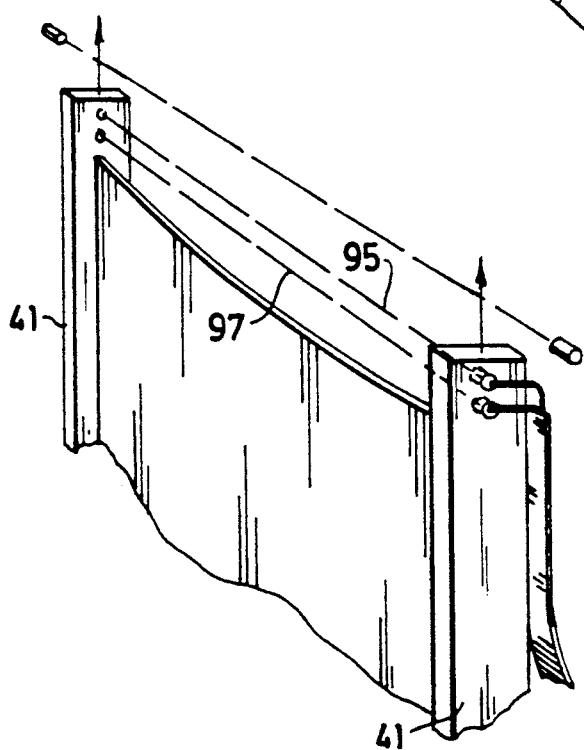
FIG. 9 is an enlarged perspective view of a portion of the top panel of the door assembly illustrating an alternate sensor for sensing if something is in the path of the door.

It is to be understood that other type sensors may be used in order to detect if an obstruction is present. For example, referring to FIG. 9, there is illustrated an alternate sensor means. In this embodiment a pair of light sensors (94),(96) are provided. The light sensors (94),(96) produce light beams (95),(97), respectively, such that if the light beam is broken a signal will be produced and sent to the microprocessor control unit which can take the appropriate action, for example, reversing the motor (60).

Figure 10:
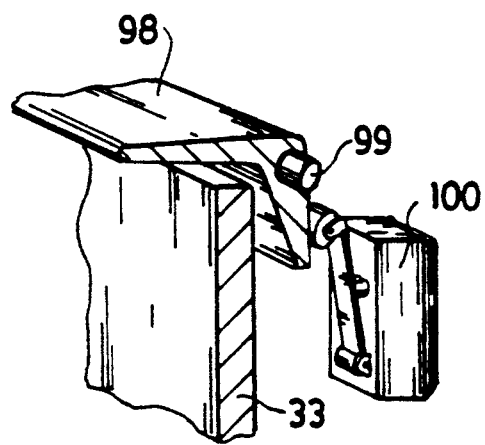
FIG. 10 is an enlarged perspective view of a portion of the top panel of the door assembly illustrating yet another sensor for sensing if something is in the path of the door.

Referring to FIG. 10, there is illustrated yet another means for detecting if an obstruction is present in the path of the door assembly. In this embodiment a lever (98) is pivotally mounted to the slide blocks (41) through pins (99), one provided at each lateral end such that if an obstruction is encountered, the lever (98) will move so as to activate switch (100) which in turn will produce an appropriate signal which will be sent to the microprocessor control unit for processing.

Figure 11:
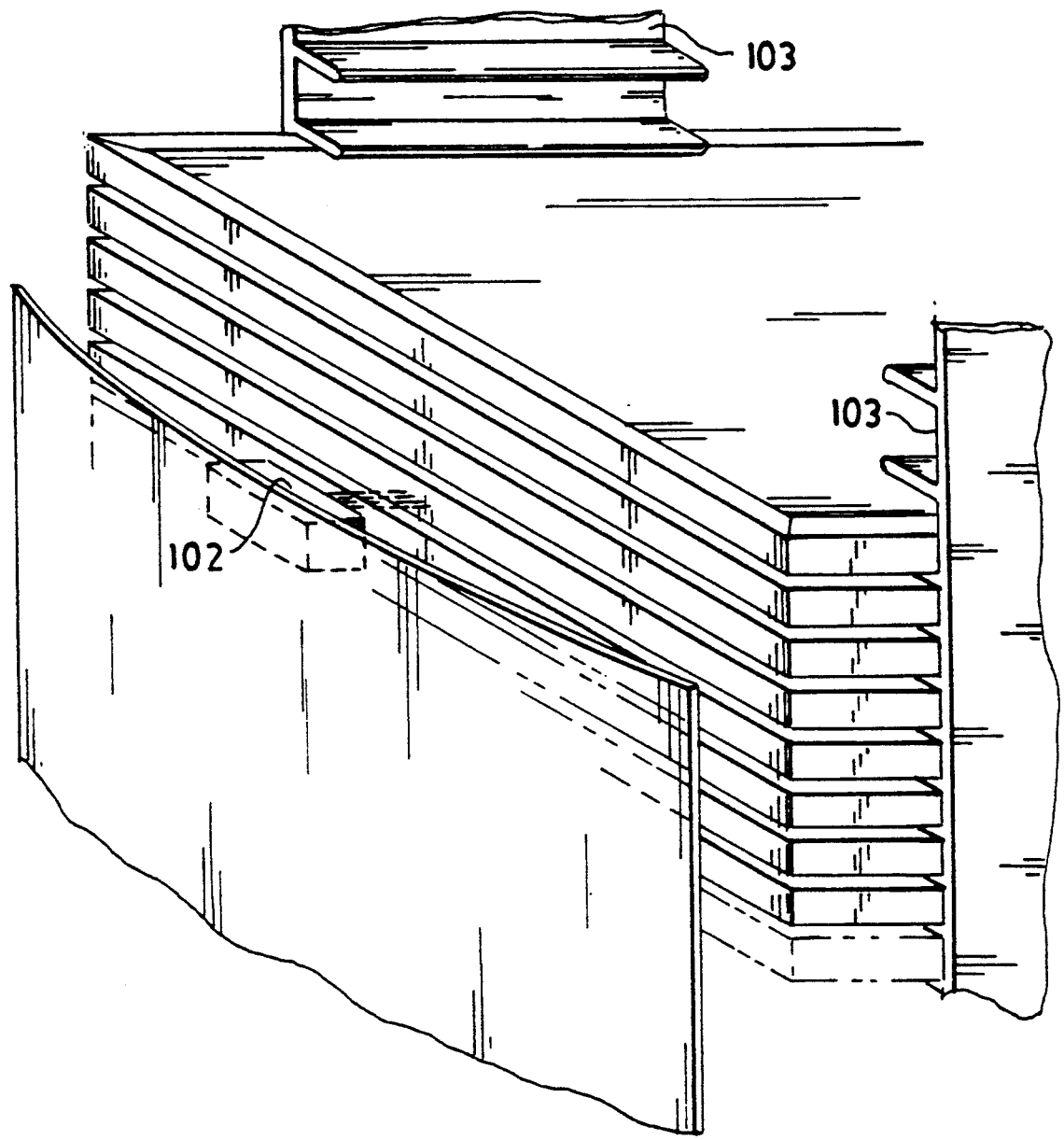
FIG. 11 is a partial view of the top panel of the door assembly of FIG. 3 and the adjacent area of the autoloader illustrating a plurality of cassettes placed in cassette retaining sites in the mechanism used for moving the cassettes within the autoloader with the top portion of the panel having a sensor for monitoring if cassettes are present in the adjacent loading or unloading site.

Referring to FIG. 11, there is illustrated the top portion of the top panel (33) with the extrusion taken off so as to illustrate sensor (102) secured to panel (33). Sensor (102) is designed to determine if a cassette is present in the adjacent loading and unloading sites as the top panel moves thereby. In this manner an appropriate signal can be produced noting whether cassette is present. In this way the microprocessor can then, if appropriate, make adjustments in the operation of the device, for example, move the cog belts (103) to the next filled cassette retaining site.

Autoloader (10) includes a retractable table (34), which can be moved between an extended stacking position, as shown in FIG. 1 and a storage retracted position, inside body (14) as shown in FIG. 2. In the storage retracted position the retractable table (34) is disposed totally within the body (14) so that the door assembly (32) can be closed as shown in FIG. 2. Table (34) can be used to hold x-ray cassettes (20) and/or pallets (22) containing cassettes during loading and unloading. The details of the construction and operation of the retractable table (34,) is described in greater detail in copending application as U.S. Ser. No. 981,630 filed concurrently with the present invention of John C. Boutet, Darryl D. DeWolff, James Lattimore, James J. Sheridan and Jeffrey J. Yaskow, entitled "Autoloader Having a Retractable Shelf". Alternatively, x-ray cassette (20) can be loaded or unloaded from a cart (not shown). Controls are provided to permit the operator to either open the door assembly (32) and have the table (34) extended automatically or to open only the door assembly (32) without extending of the retractable table.

A wide variety of means may be employed for controlling operation of the autoloader which are well known in the prior art. In the particular embodiment illustrated, the autoloader is provided with a microprocessor which is appropriately linked up to various switches, motors and controls to operate the door assembly and retractable table and various other functions of the device in a pre-set pattern. Such controls are well known and therefore will not be discussed further.

In the embodiment illustrated, the panels (33), (35) are slideably mounted through the use of slide blocks which move in mating channels. However, other means may be employed for providing the sliding action to panels(33),(35). For example, ball slides may be employed between the panels and frame of the autoloader.

Also in the embodiment illustrated, a chain is used to drive the panels up or down. Various other means may be used, such as timing belts with timing gears.

The present invention provides a mechanism for automatically opening and closing the access door to the portal of an autoloader which is designed to minimize transfer of vibrations to the reader which can adversely affect the reading of the photographic element, is reliable, can monitor if the cassettes have properly loaded or unloaded, and determine if there are obstructions in the path of the door.

It is to be understood that various modifications and changes may be made without departing from the scope of the present invention, the present invention being limited by the following claims.

We claim:

1. In an apparatus for storing and automatically delivering cassettes and/or pallets containing cassettes to a reader, comprising:
   means defining a cassette reader access site and a plurality of cassette retaining sites;
   a body encasing said means defining said cassette retaining sites, said body having a portal adjoining said cassette retaining sites for allowing cassettes to be placed on or removed from said cassette retaining sites;
   a door assembly placed adjacent said portal for allowing access through said portal, said door assembly having at least one panel slidably mounted to said apparatus for movement between a closed position and an open position, means for moving said at least one panel between the open and closed positions, and;
   means for sensing if a foreign object is in the closure path of said at least one panel.

2. In an apparatus according to claim 1 wherein said sensing means for sensing if a foreign object is in the closure path of said at least one panel comprises a pressure sensitive strip placed along the leading edge of said at least one panel.

3. In an apparatus according to claim 1 wherein said at least one panel has a leading edge, said sensing means for sensing if a foreign object is in the closure path of said at least one panel comprises sensing means located along the leading edge of said at least one panel.

4. In an apparatus according to claim 3 wherein said sensing means comprises a light sensor which produces a light beam which extends along the leading edge of said at least one panel.

5. In an apparatus according to claim 4 further comprising means for disengaging the means for moving said at least one panel between the open and closed positions when said light beam is broken.

6. In an apparatus according to claim 1 wherein said at least one panel includes a pair of parallel side edges, said at least one panel being slideably mounted to the apparatus by a pair of slide blocks which slide in a guide channel.

7. In an apparatus according to claim 6 wherein said sensing means for sensing if a foreign object is in the closure path of said at least one panel comprises a stop bar pivotally mounted to said side edges.

8. In an apparatus according to claim 7 further comprising means for controlling movement of said at least one panel when said stop bar is moved in response to engaging an obstruction.

9. In an apparatus according to claim 1 wherein said door assembly includes a second panel slidably mounted to the apparatus, said at least one and said second panels being designed to operate together.

10. In an apparatus for storing and automatically delivering cassettes and/or pallets containing cassettes to a reader, comprising:
    first and second conveyors, said conveyors having a first endless cog belt and a second endless cog belt, respectively, said cog belts being spaced apart, said cog belts each having a plurality of outwardly extending shelves in vertical alignment so as to define a cassette reader access site and a plurality of cassette retaining sites, means for driving conveyors in unison to transfer cassettes loaded in said retaining sites serially through said loading sites and said reader access site, and a body encasing said conveyors, said body having a portal adjoining said cassette retaining sites for allowing cassettes to be placed on or removed from the shelves of the cog belts, the improvement comprising:
    a door assembly placed adjacent said portal for allowing access through said portal, said door assembly having at least one panel slideably mounted to said apparatus for movement between a closed position and an open position;
    means for moving said at least one panel between the open and closed positions; and
    means for sensing if a foreign object is in the closure path of said at least one panel.

11. In an apparatus according to claim 10 wherein said sensing means for sensing if a foreign object is in the closure path of said at least one panel comprises a pressure sensitive strip placed along the leading edge of said at least one panel.

12. In an apparatus according to claim 10 wherein said at least one panel has a leading edge, said sensing means for sensing if a foreign object is in the closure path of said at least one panel comprises sensing means located along the leading edge of said at least one panel.

13. In an apparatus according to claim 12 wherein said sensing means comprises a light sensor which produces a light beam which extends across the leading edge of said at least one panel.

14. In an apparatus according to claim 13 further comprising means for controlling operation of the means for moving said at least one panel between the open and closed positions when said light beam is broken.

15. In an apparatus according to claim 10 wherein said at least one panel includes a pair of parallel side edges, said at least one panel being slidably mounted to the apparatus by a pair of slide blocks which slide in a guide channel.

16. In an apparatus according to claim 15 wherein said sensing means for sensing if a foreign object is in the closure path of said at least one panel comprises a stop bar pivotally mounted to said side edges.

17. In an apparatus according to claim 16 further comprising means for controlling the operation of the means for moving said at least one panel between the open and closed positions when said stop bar is moved in response to engaging an obstruction.

18. In an apparatus according to claim 10 wherein said door assembly includes a second panel slideably mounted to the apparatus, said at least one and said second panel being designed to operate together.

19. In an apparatus according to claim 10 wherein a ribbon cable is provided having one ned connected to said at least one panel and the other end secured to the apparatus, and means are provided for maintaining said ribbon in a predetermined position or shape.

20. In an apparatus according to claim 19 wherein said means for maintaining said ribbon in a predetermined position or shape comprises a pulley placed on said ribbon and connected to a weight.

21. In an apparatus according to claim 10 further comprising a sensor attached to said at least one panel for detecting whether a cassette is present in a said cassette retaining site when said at least one panel is moved past said retaining site.

22. In an apparatus according to claim 21 further comprising adjustment means for adjusting the position of said apparatus if said sensor senses that a cassette retaining site is filled.

* * * * *

UNITED STATES PATENT AND TRADEMARK OFFICE
CERTIFICATE OF CORRECTION

PATENT NO. : 5,319,217
DATED : June 7, 1994
INVENTOR(S) : Wayne J. Arseneault

It is certified that error appears in the above-indentified patent and that said Letters Patent is hereby corrected as shown below:

Title page, item [75], Inventors: "Wayne J. Arsenault" should read--Wayne J. Arseneault--.

Column 9, line 18, should read--ribbon cable is provided having one end connected to --.

Signed and Sealed this

Twentieth Day of September, 1994

BRUCE LEHMAN

Attest:

Attesting Officer

Commissioner of Patents and Trademarks